Figure 1:
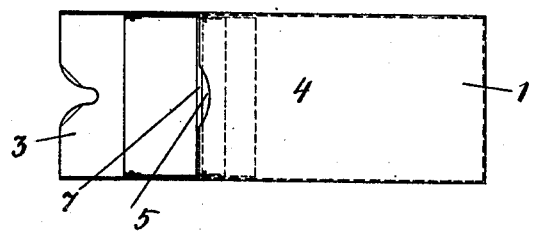

May 25, 1926.

K. H. FREDLUND 1,586,080

COMBINED DRAWING PIN EXTRACTOR AND RECEPTACLE

Filed Feb. 8, 1924

INVENTOR
KARL HERMAN FREDLUND
BY: Francis E. Boyne
ATTORNEY

Patented May 25, 1926.

1,586,080

UNITED STATES PATENT OFFICE.

KARL HERMAN FREDLUND, OF STOCKHOLM, SWEDEN.

COMBINED DRAWING-PIN EXTRACTOR AND RECEPTACLE.

Application filed February 8, 1924. Serial No. 691,418.

A drawing-pin extractor combined with a box or receptacle for the drawing-pins (thumb-tacks) is known. The said box has a trap allowing the pins automatically to enter the box but preventing them from dropping out of it, unless the trap is lifted by pressing a finger on a lever or knob projecting from it. When the box is held with its bottom downwards, it is kept constantly closed by the trap, but if the box is turned over, the trap falls down upon the lid and the box is then opened and allows the pins to pass out. Now the present invention relates to a device by which the box can be automatically closed in whatever position it is held.

Figure 2:
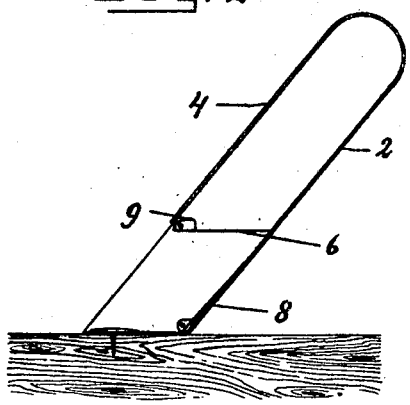
Figure 3:
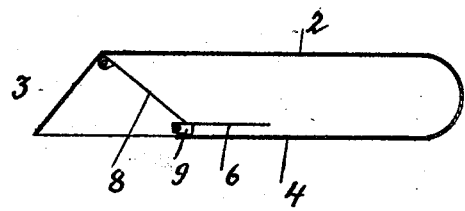

In the annexed drawing, Fig. 1 is a top view of the combined extractor and box, Fig. 2 a longitudinal section of the box with the extractor in operation for drawing out a pin, and Fig. 3 a longitudinal section of the box in an over-turned position.

The box 1 has a bottom 2 whose front end is bent upwards and forms an extractor 3 similar to an ordinary drawing-pin extractor. The lid 4 of the box is shorter than the bottom 2 and provided at its front end with a recess 5 for the purpose set forth below.

At the front end of the lid 4 there is hinged a trap 6 wider than the height of the box, so that, when falling down against the bottom 2, it is directed towards the closed rear end of the box, which is thus shut off. The upper rim 7 of the trap 6 is bent at an angle to the trap itself, so that, by putting a finger through the recess 5 and pressing on the rim 7, the trap is raised from the bottom 2.

At the front end of the bottom and below the extractor 3 there is hinged another trap 8 normally resting on the bottom 2 and of such a width as to touch the trap 6 when the box is turned over, as shown in Fig. 3.

After a drawing-pin has been extracted by pushing the part 3 under it and then pressing the box down on the table, the box is held slightly inclined with its rear end downwards, so that the trap 6 leaves the bottom 2 and allows the pin to pass into the box. In this manner the box may be gradually filled with pins. So long as the box is held with its bottom downwards, no pin can drop out.

Should the box be held with its bottom uppermost, the trap 8 drops down upon the trap 6 and effectively shuts off the box, so that neither in this case any pin can drop out of the box (see Fig. 3).

In order to prevent the two traps, when turning over the box, from assuming such a mutual position as to allow one or more pins to slip out between them, the trap 6 may be provided with lugs or shoulders 9 for preventing it from falling back on the lid of the box.

In order to release the pins, one has only to keep the box with its front end downward and to press on the rim 7, thereby lifting the trap 6 and allowing the pins to issue.

Having now described my invention, what I claim as new and desire to secure by Letters Patent is:—

1. In a device of the class described, a walled receptacle having a tack inlet opening, and a pair of gravitating gates mounted to alternately cover or uncover said opening according to the position in which the device is held.

2. In a device of the class described, a walled receptacle having a tack inlet opening, a gravitating gate mounted to normally close said opening, but adapted to swing in a direction to uncover said opening, and a second gate mounted to normally uncover said opening but adapted to swing towards said first-named gate and block said opening when the position of the device is inverted.

3. A device of the class described, comprising a walled receptacle having a tack inlet opening, and a pair of gravitating gates hinged one in advance of the other adjacent the top and bottom walls of the receptacle and adapted to alternately cover and uncover said opening according to the position in which the device is held.

4. A device of the class described, comprising a walled receptacle having a tack inlet opening, and a pair of gravitating gates hinged one in advance of the other to the side walls of the receptacle adjacent the top and bottom walls thereof, respectively, and adapted to alternately cover and uncover, said opening according to the position in which the device is held.

5. A device of the class described, comprising a walled receptacle having a tack inlet opening, and a pair of gravitating gates hinged one in advance of the other to the side walls of the receptacle adjacent the top and bottom walls thereof, respectively, one of said gates normally closing said opening and the other gate mounted to normally uncover said opening but adapted to swing towards said first-named gate and block said opening when the position of the device is inverted.

6. A device of the class described, comprising a walled receptacle including top, bottom, side and front and rear walls, said top wall terminating short of said front wall to provide a tack inlet opening and said front wall provided with a tack puller, a gravitating gate hinged adjacent the forward edge of said top wall and defining with the rear, side and top and bottom walls of said receptacle a tack chamber normally closed by said gate, the upper edge of said gate being exposed for manual operation whereby said gate may be swung towards said top wall to uncover said tack openings, and a gravitating gate hinged adjacent the juncture of the bottom and front walls and normally uncovering said tack opening but adapted to swing towards said first named gate to block said tack opening when the position of the device is inverted.

7. A device of the class described, comprising a walled receptacle including top, bottom, side and front and rear walls, said top wall terminating short of said front wall to provide a tack inlet opening and said front wall inclined upwardly from said bottom wall and provided with a tack withdrawing notch at its free edge, a gravitating gate hinged adjacent the forward edge of said top wall and defining with the rear, side and top and bottom walls of said receptacle a tack chamber normally closed by said gate; the upper edge of said gate being exposed for manual operation whereby said gate may be swung toward said top wall to uncover said tack opening, and a gravitating gate hinged, adjacent the juncture of the bottom and front walls and normally uncovering said tack opening, but adapted to swing toward said first named gate to block said tack opening when the position of the device is inverted.

8. A device of the class described, comprising a walled receptacle including top, bottom, side and front and rear walls, said top wall terminating short of said front wall to provide a tack inlet opening and said front wall inclined upwardly from said bottom wall and provided with a tack withdrawing notch at its free edge, a gravitating gate hinged adjacent the forward edge of said top wall and defining with the rear, side and top and bottom walls of said receptacle a tack chamber normally closed by said gate, said top wall being cut away at its forward edge to expose the upper edge of said gate for manual operation whereby said gate may be swung towards said top wall to uncover said tack opening, and a gravitating gate hinged to said side walls adjacent the juncture of the bottom and front walls and in advance of said first-named gate, said second-named gate normally disposed towards the bottom wall of the receptacle to uncover said tack opening but adapted to swing towards said first-named gate to block said tack opening when the position of the device is inverted.

In testimony whereof I have signed my name to this specification.

KARL HERMAN FREDLUND.